Sept. 27, 1932.  J. A. RINKER  1,880,024
GLARE DIMMER
Filed April 19, 1929
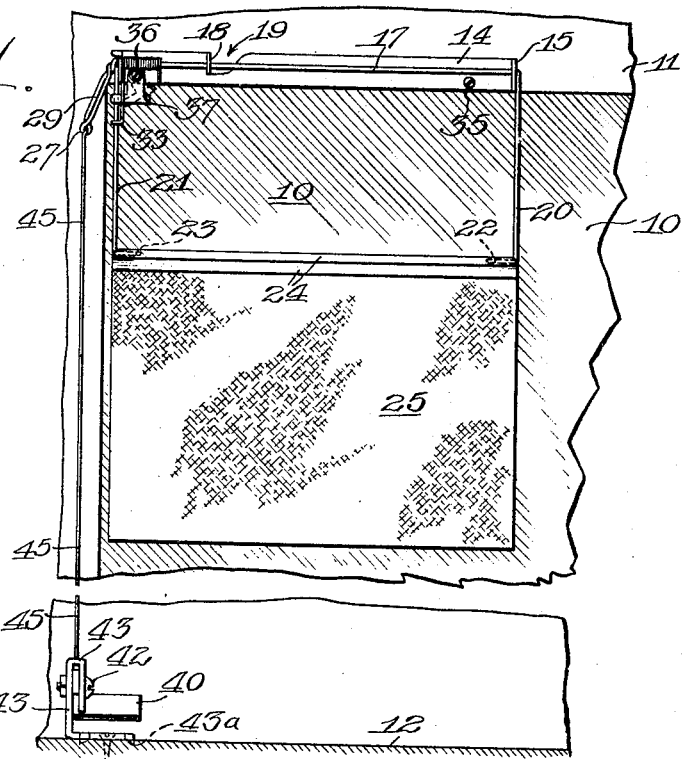
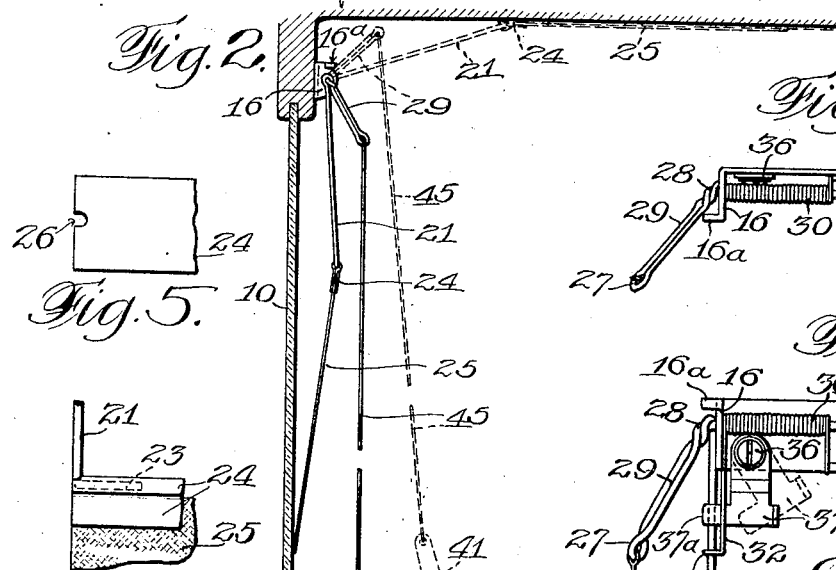
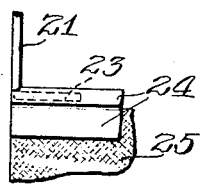
Inventor
Joseph A. Rinker
By Luther Johns
Atty.

Patented Sept. 27, 1932

1,880,024

UNITED STATES PATENT OFFICE

JOSEPH A. RINKER, OF SOUTH BEND, INDIANA

GLARE DIMMER

Application filed April 19, 1929. Serial No. 356,397.

These improvements relate to devices for use in automobiles and the like for dimming the glare or intense light of the sun and of the headlights of oncoming vehicles.

The chief object of the invention is to provide a highly advantageous, simple, low-cost, and easily and readily installable and operable device for providing safety and comfort to the operator of an automobile or other vehicle through the interpositioning of a light-ray filter between the operator's eyes and the source of intense light. Other objects and advantages will appear hereinafter.

In the drawing Figure 1 is a fragmentary view of automobile parts at the wind shield and floor board thereof with a simple embodiment of the present improvements associated therewith, the device being in its glare-dimming position;

Fig. 2 is an edge or side elevation of the device of Fig. 1, with dotted lines showing the dimming element in its out-of-the-way or raised position;

Fig. 3 is an enlarged fragmentary top view of parts of the device of Figs. 1 and 2;

Fig. 4 is an enlarged front view of the same parts, being at the upper left hand corner portion of Fig. 1;

Fig. 5 is a fragmentary face view of the blank from which the dimmer-holding element is formed; and Fig. 6 is an enlarged fragmentary side elevation of the assembly of some of the elements.

The wind shield 10, the tonneau frame work 11 above the same, and the floor board 12 are to be considered well-known parts of ordinary automobile construction.

The device illustrated comprises first an elongated main support 14 of flat sheet metal. If this metal be half an inch wide and seven or eight inches long it will meet the requirements, but these proportions may vary as desired. The right hand end of the strip 14 is turned up to form a rearwardly-projecting ear 15, and at the left hand end a similar ear 16 is provided except that a narrow extension 16a is turned outward or to the left from the ear 16 as shown by Figs. 3 and 4.

Each of the ears 15 and 16 is punched or drilled with a hole to accommodate the cylindrical rod 17, and there is also provided a third outstanding ear 18 through which the rod 17 passes. This ear 18 is formed from metal at the gap 19, Fig. 4, and forms a bearing for the rod or shaft 17 substantially close to the left hand end of the device where the spring and other operating mechanisms are located. In this connection it may be observed that if the hole in the ear 18 be slightly out of line with the corresponding holes in the other two ears through which the shaft passes it will put the shaft 17 under slight tension and prevent rattling.

The wire of the shaft 17 continues directly downward in Fig. 1 outside the ear 15 and indirectly outside the ear 16 to form the arms 20 and 21 respectively. These arms are turned inward at 22 and 23 where they are encompassed by end portions of a metal bar or cleat 24 formed of thin sheet metal doubled upon itself longitudinally to form a substantially U-shaped structure in cross view and between the sides of which the flap or dimming element 25 is tightly crimped. Fig. 5 shows one end of the blank of this cross bar or cleat 24 as having a notch 26 through which the arm 21 extends, the same construction obtaining at the opposite parts 20, 22. When these elements are assembled as in Fig. 6 the cleat 24 is carried firmly and nonrotatably at the ends of the slender arms 20 and 21 and the dimmer 25 is strongly and permanently held in its given position relative to the arms.

Before the rod material of the shaft 17 turns downward at 21 it is carried slightly to the left as viewed in Fig. 1 and rearwardly as viewed in Fig. 2, and is doubled back upon itself at 27 where the wire sections are given a slight twist to form an eye, and these wire sections are then given a twist or two at 28, Fig. 4, and the part 21 thence extends downward. An integral operating lever 29 is thus formed from the wire material, the relative positions of which are shown in Fig. 2 when the dimmer is in lowered and in raised positions respectively.

A coil spring 30 is shown surrounding the shaft 17 at its left hand end. This spring could be at the other side of the device as well, and other spring means may be employed. One end portion 31 of the spring bears against the plate-like support 14 while its other end portion 32 extends downward and is looped at 33 around the wire section 21. The tendency of the spring is to raise the arm 21, and consequently the dimmer, into the dotted line positions of these parts in Fig. 2.

The main support 14 is secured to the framework above the wind shield by screws 35 and 36. The screw 36 serves also to carry a swinging locking element or latch 37 having an end 37a which passes between the spring element 32 and the arm 21 and holds the arm, and consequently the frame as a whole, in lowered position. Figs. 1 and 4 show the swinging frame thus held, while the dotted line position of the latch 37 shows the frame released for automatic movement upward into the out-of-the-way position.

The preferred means for operating the device contemplate the use of the driver's left foot, which is adjacent to the automobile clutch pedal and not in use during continuous driving. To this end I provide a pedal 40 having a lever arm 41, all mounted by a bolt 42 on a bracket 43 secured as by a screw to the base board of the car. This bracket has a rectangular base, and if the corners 43a thereof, or several of them, be turned downward slightly so as to press into the floor board a single screw will hold the bracket firmly. A piece of cord or light cable 45 connects the levers 41 and 29.

The dimming element 25 is preferably a piece of pyrolin, celluloid or the like in a suitable color, such as amber or green, adapted to filter out objectionable rays. The element 25 is highly translucent and would ordinarily be called transparent. It does not interfere objectionally with the vision. In its most approved form it is a light-weight color screen.

Note from Fig. 2 that when the dimmer is down its lower edge is in contact with the wind shield as 10. This has the effect of stabilizing it in its desired location and preventing its fluttering due to currents of air.

The use of the device is variously called for, as when at night an automobile is approaching with strong headlights in operation. The driver of the car equipped with the present device simply puts his foot upon the pedal 40, lowering the dimmer and holding it down while the cars are passing each other. Upon removing the foot the dimmer automatically moves into the out-of-the-way position. When driving with the sunlight striking the eyes, the operator will press upon the foot pedal 40 to lower the dimmer and will thereupon swing to the left the latch 37, locking the dimmer in its lowered position. From this position it may readily be released, by simply reaching up with the hand and moving the latch to the right. When in the raised position of Fig. 2 the dimmer lies against or substantially against the roof of the car. Means are provided, however, for limiting such upward movement, namely the projection 16a, Fig. 4, of the ear 16. That projection is in the path of upward movement of the lever 29, as shown in Fig 2.

The device thus illustrated and described is exceedingly simple, of few parts not likely to get out of order is easily installed is of low cost and of notable convenience and utility in use.

It is not necessary to practical and beneficial results to incorporate the automatic movement of the dimmer in one direction or the other; nor is the operation by foot an essential. The construction and proportions may likewise vary.

I therefore contemplate as being included in the invention thus set forth all such variations, changes and departures as fall within the scope of the appended claim.

I claim:

In a dimmer device of the character described, a construction comprising an elongated support adapted to be positioned above a wind shield, said support having perforated outstanding ears for holding a rod, a rod extending through the perforations of said ears for rocking movements therein, said rod having a pair of arms extending substantially in the same plane away from the rod and having free end portions, a cross member rigidly connecting the free end portions of the arms to produce a substantially rectangular dimmer frame, and a piece of substantially stiff light-weight translucent material rigidly secured to said cross member to move when the dimmer frame is moved.

JOSEPH A. RINKER.